United States Patent Office 3,035,034
Patented May 15, 1962

3,035,034
HOMOPOLYMER OF 2,3-BIS(TRIFLUOROMETHYL)-1,3-BUTADIENE AND PROCESS OF PREPARING SAME
Blaine C. McKusick and Robert E. Putnam, Wilmington, Del., assignors to E. I. du Pont de Nemours and Company, Wilmington, Del., a corporation of Delaware
No Drawing. Filed Aug. 5, 1958, Ser. No. 753,197
12 Claims. (Cl. 260—92.1)

This invention relates to 2,3-bis(trifluoromethyl)-1,3-butadiene and particularly to its preparation.

Fluorine-containing compounds have received considerable attention in recent years. Fluoro-substituted ethylenes have been used in the preparation of inert thermoplastic polymers. Less attention has been given to dienes containing fluorine. Dienes generally polymerize to rubbery products. This is shown to be true for 2-trifluoromethyl-1,3-butadiene in U.S. 2,490,753.

There has now been prepared monomeric 2,3-bis(trifluoromethyl)-1,3-butadiene and this compound polymerized to a solid polymer by free-radical catalysis. The polymers obtained are inert, but contrary to expectations, are not rubbery.

Monomeric 2,3-bis(trifluoromethyl)-1,3-butadiene is obtained by the following reactions:

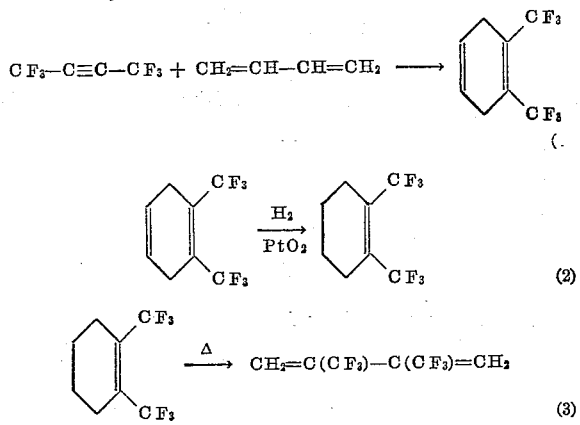

The reaction of Equation 1 is a Diels-Alder reaction. Hexafluoro-2-butyne employed with butadiene has been described in U.S. 2,546,997. The Reaction 1 takes place in equimolar ratio of the reactants; however, it is preferred that butadiene be present in excess, generally in a molar ratio of between about 1:1 and 2:1 of the hexafluorobutyne. The reaction takes place at room temperature without added catalysts, although temperatures of up to 150° C. in the presence of a polymerization inhibitor can be employed. The use of higher temperature generally reduces the time for the reaction. Maximum (and substantially quantitative) yields appear to be obtained at room temperature and under autogenous pressure. This reaction is illustrated by Examples A and B given hereinafter.

The reaction of Equation 2 can also be effected to give substantially quantitative yields. The reaction involves hydrogenation by use of a selective hydrogenation catalyst such as platinum oxide under superatmospheric pressure. The time of reaction is generally from a few minutes to an hour or longer. It is dependent upon the temperature and hydrogen pressure. This reaction is specifically illustrated by Examples C and D.

Monomeric 2,3-bis(trifluoromethyl)-1,3-butadiene results from thermal decomposition of 1,2-bis(trifluoromethyl)cyclohexene as shown in Equation 3. The reaction involves temperatures in the range of preferably 650–1000° C. The reaction is conducted at reduced pressure (preferably less than 100 mm. of Hg). Inert heat transfer packing for the cracking reaction vessel is usually employed to effect efficient heat transfer. Particularly suitable is quartz since it is thermally stable under the reaction conditions conventionally used.

The 2,3-bis(trifluoromethyl)-1,3-butadiene obtained is a liquid boiling at 58–59° C. It is characterized by a refractive index ($n_D^{25}$) of about 1.32 and major bands of infrared absorption at 3.20, 3.30, 5.20, 6.20, 7.10, 7.35, 7.73, 8.45, 8.80, 9.17, 10.45, 11.67, 12.25, 12.57, 14.50, and 14.75μ.

The 2,3-bis(trifluoromethyl)-1,3-butadiene polymerizes to a non-rubbery polymer inert to organic solvents. The polymer is stable at temperatures of up to about 300° C. These properties are generally maintained in copolymers wherein the 2,3-bis(trifluoromethyl)-1,3-butadiene is the major component. Monomers that can be copolymerized with the 2,3-bis(trifluoromethyl)-1,3-butadiene are monoethylenically-unsaturated (i.e., vinyl or vinylidene type) compounds, including hydrocarbons, such as ethylene; halogenated hydrocarbon, such as vinyl chloride, vinylidene chloride, vinyl fluoride, tetrafluoroethylene, chlorotrifluoroethylene; vinyl ethers, such as ethyl vinyl ether; acrylyl compounds, such as acrylonitrile, methyl methacrylate; and vinyl carboxylates, such as vinyl acetate.

Polymerization is effected by the use of customary initiators for free-radical catalyzed reactions. Peroxy catalysts as well as azo catalysts of the type described in U.S. 2,471,959, can be employed in amounts of 0.005 to 5% by weight of the ethylenically unsaturated monomeric compound.

The polymerization can be carried out in the presence or absence of solvents or diluents.

The polymers thus obtained are useful for the preparation of inert products, e.g., films are useful as gaskets and a comminuted mass is of utility as valve packing material.

The following examples further illustrate the preparation and polymerization of 2,3-bis(trifluoromethyl)-1,3-butadiene.

EXAMPLE I

*Preparation of 2,3-Bis(Trifluoromethyl)-1,3-Butadiene*

A pyrolysis apparatus, which consisted of a dropping funnel and vertical quartz tube 12 inches in length and ¾ inch in diameter and packed with quartz rings, was attached to a Dry Ice trap and liquid nitrogen cooled trap in series and evacuated to 3 mm. The tube was heated to 750° C. by means of a standard tube furnace and 15 g. of 1,2-bis(trifluoromethyl)cyclohexene was admitted dropwise. There was obtained 14 g. of light yellow condensate of B.P. greater than 25° C. Distillation gave 6 g. (40%) of 2,3-bis(trifluoromethyl)-1,3-butadiene of B.P. 58–60° C., $n_D^{25}=1.3236$. Small amounts of trifluoromethyl benzene and 1,2-bis(trifluoromethyl)benzene were also isolated.

*Analysis.*—Calcd. for $C_8H_4F_6$: C, 37.9; H, 2.1; F, 60.0. Found: C, 38.91; H, 2.41; F, 59.54.

The 1,2-bis(trifluoromethyl)cyclohexene was obtained from hexafluoro-2-butyne by the following reactions wherein Examples A and B illustrate the preparation of the corresponding hexadiene and Examples C and D show conversion to the hexene employed in Example I above.

EXAMPLE A

An 80 ml. stainless steel bomb containing 12.5 g. (0.23 mole) of butadiene, 18 g. (0.11 mole) of hexafluoro-2-butyne, and 0.4 g. of hydroquinone was heated for six hours at 143° C. After cooling and venting the bomb there was obtained 14 g. of pale yellow liquid containing suspended hydroquinone. Distillation gave, after a forerun of butadiene dimer, 5.6 g. (23%) of 1,2-bis(trifluoromethyl)-1,4-cyclohexadiene, B.P. 135° C., $n_D^{25}=1.3779$.

*Analysis.*—Calcd. for $C_8H_6F_6$: C, 44.5; H, 2.8; F, 52.7. Found: C, 45.69; H, 3.01; F, 51.58.

EXAMPLE B

In an evacuated stainless cylinder (300 cc.) were charged 28 g. of hexafluoro-2-butyne and 12 g. of butadiene. The cylinder was allowed to stand at room temperature for 60 hours. On bleeding the cylinder there was obtained 35 g. (94%) of pure 1,2-bis(trifluoromethyl)-1,4-cyclohexadiene, B.P. 135° C., $n_D^{25}=1.3778$.

EXAMPLE C

In a 500 cc. pressure bottle were placed 34.3 g. (0.16 mole) of 1,2 - bis(trifluoromethyl) - 1,4 - cyclohexadiene, 200 cc. methanol and 1 g. of platinum oxide. The bottle was pressured to 30 p.s.i. with hydrogen. Adsorption of 0.16 mole of hydrogen occurred in five minutes. Distillation gave 17.3 g. (50%) of 1,2-bis(trifluoromethyl)cyclohexene, B.P. 145° C., $n_D^{25}=1.3708$.

*Analysis.*—Calcd. for $C_8F_6H_8$: C, 44.1; H, 3.7; F, 52.2. Found: C, 44.77; H, 3.71; F, 52.25.

EXAMPLE D

In a 500 cc. pressure bottle were placed 66 g. of 1,2-bis(trifluoromethyl)-1,4-cyclohexadiene and 0.5 g. of platinum oxide. The bottle was pressured to 30 p.s.i. with hydrogen at room temperature. Adsorption of the required amount of hydrogen took place in one hour. The product was filtered to remove catalyst. There was obtained 59 g. (89%) of pure 1,2-bis(trifluoromethyl)cyclohexene, B.P. 145° C., $n_D^{25}=1.3709$.

EXAMPLE II

*Polymerization of 2,3-Bis(Trifluoromethyl)-1,3-Butadiene*

In a Carius tube were charged 0.005 g. of azodiisobutyronitrile, 1.5 g. of 2,3-bis(trifluoromethyl)butadiene and 3 cc. of benzene. The tube was cooled, evacuated and sealed. It was heated to 90° C. for four hours. The tube was cooled, opened, and the benzene was removed from the product by evaporation. There remained 0.1 g. (7%) of poly-2,3-bis(trifluoromethyl)butadiene as a white powder.

EXAMPLE III

*Polymerization of 2,3-Bis(Trifluoromethyl)-1,3-Butadiene*

In a platinum tube, 6 inches long x 0.5 inch in diameter and sealed at one end, were placed 3.0 g. of bis(trifluoromethyl)butadiene and 0.01 g. of azodiisobutyronitrile. The tube was cooled to −80° C., flushed with dry nitrogen, and sealed. It was then placed in a 200 cc. stainless steel high pressure bomb, which was pressured to 2000 atm. with nitrogen, and was heated to 80° C. for 16 hours. There was obtained 3.0 g. (100%) of white opaque polymer as a solid plug. The polymer could be pressed to a stiff film at 325° C. and 15,000 lbs. ram pressure. The polymer burned but did not support combustion. On heating on a block it melted and decomposed slowly at 355° C. It was completely unaffected by boiling dimethylformamide, boiling aniline, boiling n-butylamine and boiling concentrated nitric acid.

EXAMPLE IV

*Polymerization of 2,3-Bis(Trifluoromethyl)-1,3-Butadiene*

Polymerization of 3 g. of bis(trifluoromethyl)butadiene using 0.01 g. azobis(dimethylvaleronitrile) at 1000 atm. and 50° C. using the technique described in Example III gave 1.3 g. (43%) of poly-2,3-bis(trifluoromethyl)butadiene. The polymer was identical to that described in Example III.

*Analysis.*—Calcd. for $(C_6F_6H_4)_x$: C, 37.9; H, 2.1; F, 60.0. Found: C, 37.29; H, 2.41; F, 59.19.

EXAMPLE V

*Polymerization of 2,3-Bis(Trifluoromethyl)-1,3-Butadiene*

In a small glass tube were placed 3 g. of bis(trifluoromethyl)butadiene and 0.01 g. of azodiisobutyronitrile. The tube was cooled to −80° C., evacuated, and sealed. It was heated to 80° C. for 20 hours. There was obtained 0.3 g. (10%) of polymer similar in all respects to that described in Example III.

Since obvious modifications in the invention will occur to those skilled in the chemical arts, we propose to be bound solely by the appended claims.

The embodiments of the invention in which an exclusive property or privilege is claimed are defined as follows:

1. The process of preparing 2,3-bis(trifluoromethyl)-1,3-butadiene which comprises pyrolyzing 1,2-bis(trifluoromethyl)cyclohexene at a temperature of about 650–1000° C. and at less than atmospheric pressure.

2. The process of claim 1 accomplished at a pressure of less than about 100 mm.

3. A nonrubbery polymer of 2,3-bis(trifluoromethyl)-1,3-butadiene.

4. Nonrubbery poly-2,3-bis(trifluoromethyl)butadiene.

5. The process which comprises contacting 2,3-bis-(trifluoromethyl)-1,3-butadiene with an initiator for free-radical catalyzed reactions and thereby forming nonrubbery poly-2,3-bis(trifluoromethyl)butadiene.

6. The process of claim 5 carried out in an inert organic medium.

7. The process of claim 5 in which the initiator is an azo compound.

8. The process of claim 7 in which the initiator is azodiisobutyronitrile.

9. The process of claim 7 in which the initiator is azobis(dimethylvaleronitrile).

10. The process of claim 5 in which the initiator is a peroxide.

11. The polymer of claim 3 in the form of a film.

12. The polymer of claim 4 in the form of a film.

References Cited in the file of this patent
UNITED STATES PATENTS

| | | |
|---|---|---|
| 2,471,959 | Hunt | May 31, 1949 |
| 2,668,182 | Miller | Feb. 2, 1954 |

OTHER REFERENCES

Henne et al.: J. Am. Chem. Soc., 76, 5147-8 (1954).